United States Patent
Cui

(10) Patent No.: US 11,164,604 B2
(45) Date of Patent: Nov. 2, 2021

(54) VIDEO EDITING METHOD AND APPARATUS, COMPUTER DEVICE AND READABLE STORAGE MEDIUM

(71) Applicant: BEIJING MICROLIVE VISION TECHNOLOGY CO., LTD, Beijing (CN)

(72) Inventor: Hao Cui, Beijing (CN)

(73) Assignee: BEIJING MICROLIVE VISION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/018,350

(22) Filed: Sep. 11, 2020

(65) Prior Publication Data

US 2020/0411059 A1 Dec. 31, 2020

Related U.S. Application Data

(63) Continuation of application No. PCT/CN2019/113010, filed on Oct. 24, 2019.

(30) Foreign Application Priority Data

Nov. 8, 2018 (CN) .......................... 201811323174.6

(51) Int. Cl.
  G11B 27/06 (2006.01)
  G11B 27/036 (2006.01)
  G11B 27/10 (2006.01)
(52) U.S. Cl.
  CPC ............ *G11B 27/06* (2013.01); *G11B 27/036* (2013.01); *G11B 27/102* (2013.01)
(58) Field of Classification Search
  CPC ...... G11B 27/06; G11B 27/036; G11B 27/102
  (Continued)

(56) References Cited

U.S. PATENT DOCUMENTS

2002/0018645 A1* 2/2002 Nakamatsu .......... H04N 9/8042
  386/278
2005/0042591 A1* 2/2005 Bloom ................. G11B 27/034
  434/307 A (Continued)

FOREIGN PATENT DOCUMENTS

CN 102638658 A 8/2012
CN 104333802 A 2/2015

(Continued)

OTHER PUBLICATIONS

International Search Report and Written Opinion dated Jan. 8, 2020 for PCT Patent Application PCT/CN2019/113010.

(Continued)

*Primary Examiner* — Loi H Tran
(74) *Attorney, Agent, or Firm* — Thomas | Horstemeyer LLP

(57) ABSTRACT

Disclosed are a video editing method and apparatus, a device and a readable-storage medium. The method includes: acquiring a first video, separating a first video signal of the first video and an audio signal of the first video, collecting a second video signal, and synthesizing the collected second video signal with the audio signal to obtain a second video, clipping the first video and the second video to obtain a plurality of first short videos and a plurality of second short videos respectively; and selecting, according to the audio signal, a first target short video and a second target short video from the multiple first short videos and the multiple second short videos, and stitching the first target short video and the second target short video.

20 Claims, 6 Drawing Sheets

(58) Field of Classification Search
USPC .......................................................... 386/285
See application file for complete search history.

(56) References Cited

U.S. PATENT DOCUMENTS

| | | | | |
|---|---|---|---|---|
| 2010/0183280 | A1* | 7/2010 | Beauregard | G11B 27/34 |
| | | | | 386/285 |
| 2011/0007797 | A1 | 1/2011 | Palmer et al. | |
| 2013/0301918 | A1* | 11/2013 | Frenkel | G11B 27/036 |
| | | | | 382/180 |
| 2014/0105567 | A1 | 4/2014 | Casagrande et al. | |
| 2017/0110151 | A1* | 4/2017 | Matias | G06K 9/00758 |
| 2018/0367827 | A1* | 12/2018 | Chen | H04N 21/6582 |

FOREIGN PATENT DOCUMENTS

| | | | |
|---|---|---|---|
| CN | 105611404 | A | 5/2016 |
| CN | 105791938 | A | 7/2016 |
| CN | 105812920 | A | 7/2016 |
| CN | 106792152 | A | 5/2017 |
| CN | 107018443 | A | 8/2017 |
| CN | 107393569 | A | 11/2017 |
| CN | 108028054 | A | 5/2018 |
| CN | 108055490 | A * | 5/2018 |
| CN | 108055490 | A | 5/2018 |
| CN | 108337558 | A | 7/2018 |
| CN | 109379633 | A | 2/2019 |
| EP | 3361738 | A1 | 8/2018 |

OTHER PUBLICATIONS

1st Search Report dated May 8, 2019 for Chinese Patent Application No. 201811323174.6.
1st Office Action dated May 17, 2019 for Chinese Patent Application No. 201811323174.6.
2nd Office Action dated Aug. 2, 2019 for Chinese Patent Application No. 201811323174.6.
Supplementary Search dated Oct. 15, 2019 for Chinese Patent Application No. 201811323174.6.

* cited by examiner

VIDEO EDITING METHOD AND APPARATUS, COMPUTER DEVICE AND READABLE STORAGE MEDIUM

CROSS-REFERENCE TO RELATED APPLICATIONS

This is a continuation of International Patent Application No. PCT/CN2019/113010, filed on Oct. 24, 2019, which is based on and claims priority to Chinese patent application No. 201811323174.6 filed with CNIPA on Nov. 8, 2018, disclosures of which are incorporated herein by reference in their entireties.

TECHNICAL FIELD

The present disclosure relates to the field of computer technologies, for example, to a video editing method and apparatus, a computer device and a readable storage medium.

BACKGROUND

In daily life, the existence of multiple media has added a lot of color to people's daily life, thus enriching people's life. Among them, the appearance of videos is closely related to people's daily life, and a variety of TV programs have won the love of many viewers. A large number of recorded video programs need to be clipped and edited before the TV programs are played.

A video editing method in the existing art includes following steps: another video signal and another audio signal are inserted into an original video including an audio signal, and the added video signal and the added audio signal are synthesized with the video signal and the audio signal in the original video to obtain an edited new video.

However, according to the video editing method in the existing art, the obtained synthesized video will have discontinuous audio signals, thus resulting in a poor playing effect of the synthesized video.

SUMMARY

The present disclosure provides a video editing method and apparatus, a computer device and a readable storage medium for improving that a synthesized video has a poor playing effect.

A video editing method is provided in the present disclosure and includes steps described below.

A first video is acquired, a first video signal of the first video and an audio signal of the first video are separated, a second video signal is collected, and the collected second video signal is synthesized with the audio signal to obtain a second video, the first video and the second video are clipped to respectively obtain multiple first short videos and multiple second short videos, and according to the audio signal, a first target short video and a second target short video are selected from the multiple first short videos and the multiple second short videos, and the first target short video and the second target short video are stitched to obtain a target synthesized video.

A video editing apparatus is provided in the present disclosure and includes an acquisition module, a separation module, a collection module, a clipping module and a stitching module.

The acquisition module is configured to acquire a first video.

The separation module is configured to separate a first video signal of the first video and an audio signal of the first video.

The collection module is configured to collect a second video signal, and synthesize the collected second video signal with the audio signal to obtain a second video.

The clipping module is configured to clip the first video and the second video to obtain multiple first short videos and multiple second short videos respectively.

The stitching module is configured to select, according to the audio signal, a first target short video and a second target short video from the multiple first short videos and the multiple second short videos, and stitch the first target short video and the second target short video to obtain a target synthesized video.

A computer device is provided in the present disclosure and includes a memory and a processor, where the memory stores computer programs executable on the processor, and when the processor executes the computer programs, the processor implements following steps.

A first video is acquired.

A first video signal of the first video and an audio signal of the first video are separated.

A second video signal is collected, and the collected second video signal is synthesized with the audio signal to obtain a second video.

The first video and the second video are clipped to obtain multiple first short videos and multiple second short videos respectively.

According to the audio signal, a first target short video and a second target short video are selected from the multiple first short videos and the multiple second short videos, and the first target short video and the second target short video are stitched to obtain a target synthesized video.

A readable storage medium is provided in the present disclosure and is configured to store computer programs for implementing following steps when the computer programs are executed by a processor.

A first video is acquired.

A first video signal of the first video and an audio signal of the first video are separated.

A second video signal is collected, and the collected second video signal is synthesized with the audio signal to obtain a second video.

The first video and the second video are clipped to obtain multiple first short videos and multiple second short videos respectively.

According to the audio signal, a first target short video and a second target short video are selected from the multiple first short videos and the multiple second short videos, and the first target short video and the second target short video are stitched to obtain a target synthesized video.

DETAILED DESCRIPTION

Schemes in embodiments of the present disclosure will be described in conjunction with the drawings in embodiments of the present disclosure. Apparently, the embodiments described below are part, not all, of embodiments of the present disclosure. A video editing method provided in the embodiments of the present disclosure may be applied to a computer device. The computer device may be an electronic device with video image acquisition and processing functions such as a mobile phone, a tablet computer, a laptop, a desktop computer and the like. The form of the computer device is not limited in the embodiments.

An execution body of the video editing method provided in the embodiments of the present disclosure may be a video editing apparatus, where the video editing apparatus may implement as part or all of a computer device by means of software, hardware, or a combination of software and hardware. The execution body of the following method in the embodiments will be described by taking the computer device as an example.

The embodiments described herein are intended to explain but not to limit the present disclosure. The terms "first", "second" and the like in the specification, claims and drawings of the present disclosure are used to distinguish between similar objects and used to facilitate description.

Figure 1:
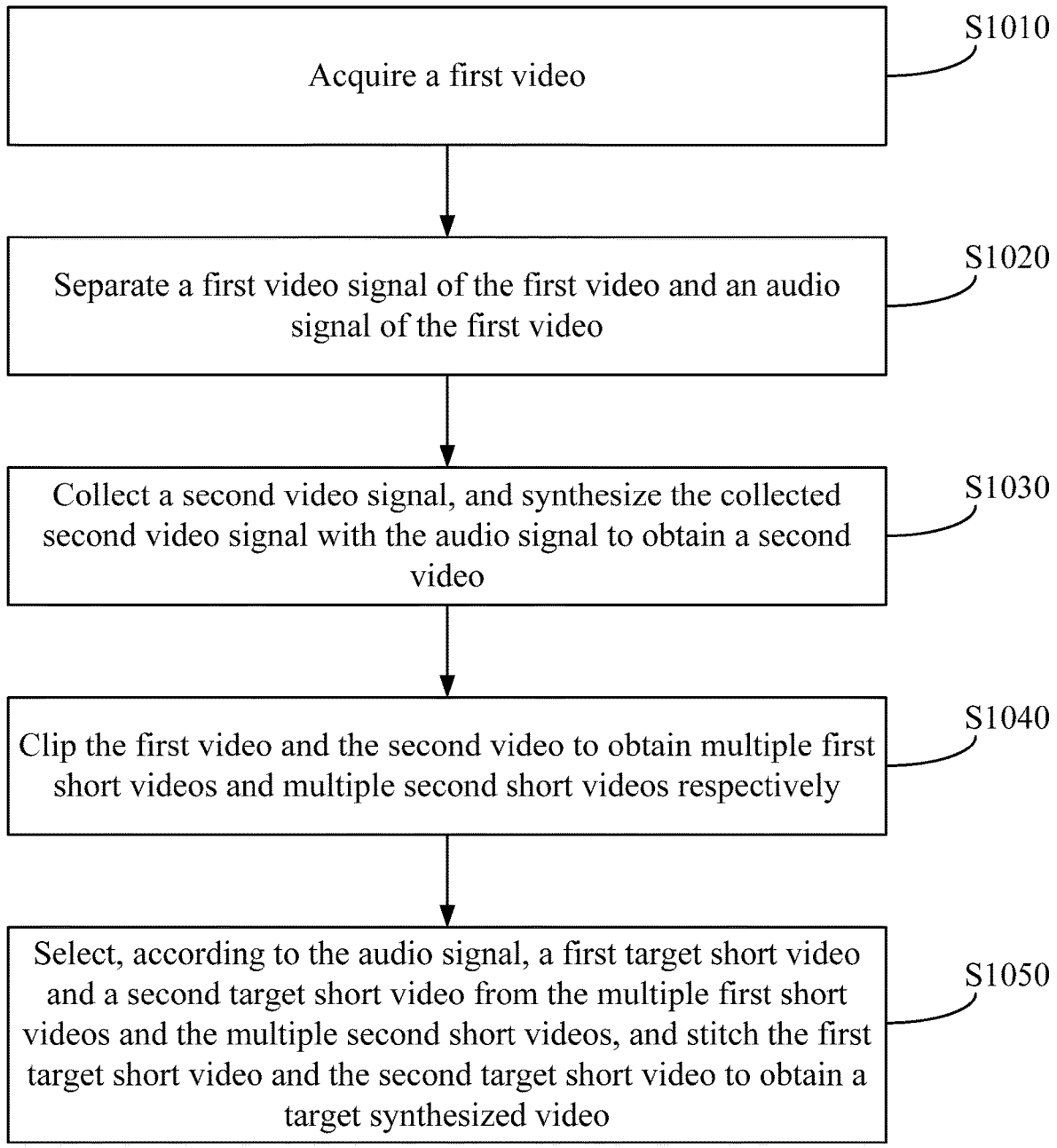
FIG. 1 is a flowchart of a video editing method according to an embodiment of the present disclosure.

FIG. 1 is a flowchart of a video editing method according to an embodiment of the present disclosure. This embodiment relates to a process of clipping a first video and a second video to obtain a target synthesized video. As shown in FIG. 1, the method includes steps described below.

In step S1010, a first video is acquired.

For example, the first video may be a video locally stored on a computer device, a locally saved video pre-filmed by the computer device or a pre-download and locally saved video by the computer device, or may be a video stored in a cloud, and the computer device may download the video from the cloud.

In step S1020, a first video signal of the first video and an audio signal of the first video are separated.

In an embodiment, the computer device may separate the first video through an application program having a sound file separation function to obtain the first video signal and the audio signal. In the application program, the first video signal may be placed in a video track and the audio signal may be placed in an audio track.

In step S1030, a second video signal is collected, and the collected second video signal is synthesized with the audio signal to obtain a second video.

In an embodiment, the computer device may synthesize the collected second video signal with the audio signal obtained by separating the first video to obtain the second video. Therefore, the second video is a video synthesized the second video signal with the audio signal of the first video.

In an embodiment, the computer device may synthesize the second video signal with the audio signal through the application program having an audio and video synthesis function. For example, the above second video signal may be a video signal obtained by real-time filming according to a filming command received by the computer device, where the above filming command may be generated by a user through continuously clicking of a filming button on the computer device, or may be a locally saved video signal pre-filmed by the computer device or a pre-download and locally saved video signal by the computer device, further may be a video signal stored in the cloud.

A duration of the second video signal is equal to a duration of the first video signal.

In a process of collecting the second video signal, the computer device may collect the second video signal according to a length of the first video signal, so that the collected second video signal has a same duration as the first video signal. In an embodiment, the computer device may also clip the collected second video signal into a video signal having a same duration as the first video signal through an application program having the clipping function. The duration of the second video signal may also different from the duration of the first video signal.

Exemplarily, if the second video is collected by filming, a user may press the filming button on the computer device once to collect the second video signal, or may also press the filming button on the computer device for many times to collect second video signals filmed in real-time.

In step S1040, the first video and the second video are clipped to obtain multiple first short videos and multiple second short videos respectively.

For example, the computer device may clip the first video and the second video to obtain the multiple first short videos and the multiple second short videos respectively through the application program with the clipping function.

A number of the second short videos is equal to a number of the first short videos.

In an embodiment, the computer device may determine the number of segments for clipping the first video and the second video according to semantics of the audio signal or segment information about the video signal, where the number of segments for clipping the first video and the second video may be flexibly set without fixity. Exemplarily, if a video signal of the first video is different from a video signal of the second video, and the audio signal of the first video is the same as an audio signal of the second video, the audio signal may be a song with lyrics of "youth is like a running river", then the first video and the second video may be clipped into three short videos respectively according to the semantics, and audio signals of the three short videos are "youth", "like running" and "river" respectively; and if one segment of the video signals in the first video or the second video is a complete video segment, which starts with the beginning of a shot and ends with the end of the shot, and the first video and the second video may be clipped according to the complete video segment when clipping.

Exemplarily, when the collected second video signal is different from the first video signal, the duration of the first video is 6 minutes, and the duration of the collected second video is 4 minutes, where the audio signal at the start time of the second video corresponds to the audio signal at the time of 2 minutes of the first video, that is, when the audio signal is played to 2 minutes, the collection of the second video signal is started, at the moment, the computer device will first clip the first video with a longer duration into a video which has a duration equal to that of the audio signal of the second video with a shorter duration for the short video clipping.

In step S1050, according to the audio signal, a first target short video and a second target short video are selected from the multiple first short videos and the multiple second short videos, and the first target short video and the second target short video are stitched to obtain a target synthesized video.

In an embodiment, according to a playing sequence of the audio signal, the computer device may select the first target short video and the second target short video from the multiple first short videos and the multiple second short videos, and stitch the first target short video and the second target short video to obtain a target synthesized video which has an audio signal same as the audio signal of the first video and the audio signal of the second video. In the video editing method provided in the embodiment, according to the audio signal of the first video and the audio signal of the second video, the computer device may select the first target short video and the second target short video from the multiple clipped first short videos and the multiple clipped second short videos, and stitch the first target short video and the second target short video to obtain the target synthesized video in which a video picture may be switched to a picture of a first short video or a picture of a second short video, and the audio signal of the first video or the second video is served as an audio signal of the target synthesized video, so that discontinuity of the audio signal does not occur, and the playing effect of the target synthesized video is improved.

Figure 2:
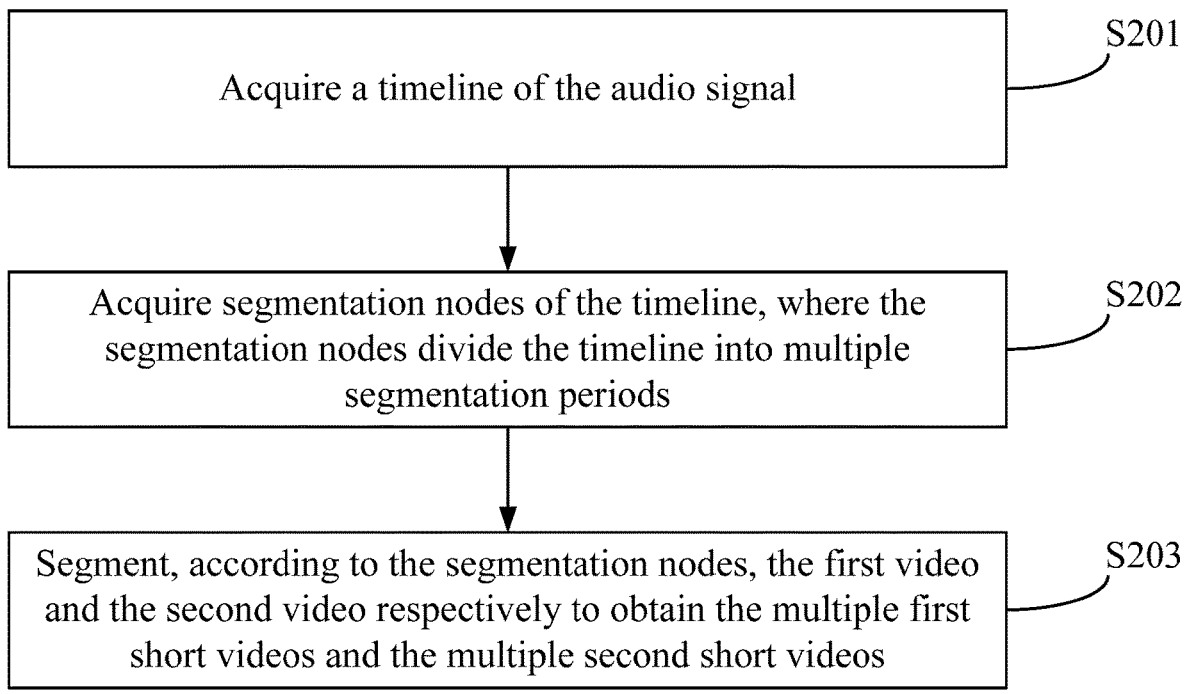
FIG. 2 is a flowchart of a method for clipping a first video and a second video according to an embodiment of the present disclosure.

FIG. 2 is a flowchart of a method for clipping a first video and a second video according to an embodiment of the present disclosure. In above step S1040, the first video and the second video are clipped to obtain the multiple first short videos and the multiple second short videos, which may be achieved by the method shown in FIG. 2, and the method includes steps described below.

In step S201, a timeline of the audio signal is acquired.

In an embodiment, the computer device may acquire the timeline of the audio signal through an application program with a playing function.

In step S202, segmentation nodes of the timeline are acquired, and the segmentation nodes divide the timeline into multiple segmentation periods.

In an embodiment, the above segmentation nodes may be determined according to the semantics of the audio signal or the segment information about the video signal, one or more segmentations nodes are predetermined, and the one or more segmentation nodes may divide the timeline of the audio signal into the multiple segmentation periods. The number of segmentation nodes has a corresponding relation with the number of the first short videos and the number of the second short videos, and the number of segmentation periods is equal to the number of the first short videos and the number of the second short videos.

Exemplarily, if the video signal of the first video is different from the video signal of the second video, the audio signal of the first video and the audio signal of the second video may be the song with the lyrics of "youth is like a running river", and the total timeline length of the audio signal is 8 seconds, then the first video and the second video may be respectively clipped into three short videos according to the semantics, and the audio signals of these three short videos are "youth", "like running" and "river" respectively. For the first video or the second video, on the timeline of the audio signal, a moment after the lyric "youth" is played is served as one segmentation node, and a moment after the lyric "like running" is played is served as another segmentation node, i.e., the number of video segmentation nodes is equal to the number of segmented segments minus 1. If a certain segment of the video signal in the first video or the second video is a complete video segment, the first video and the second video may be clipped according to the complete video segment when clipping, the number of clipped segments is set to be 3, and a moment before the complete video segment in the first video or the second video starts and a moment after the complete video segment in the first video or the second video ends may be served as two segmentation nodes. At the same time, if the duration of the first video is 8 seconds, the first video is clipped into three short videos, which includes a short video of 0 to 2 seconds, a short video of 2 to 6 seconds and a short video of 6 to 8 seconds respectively, and then the segmentation periods of the second video are 0 to 2 seconds, 2 to 6 seconds, and 6 to 8 seconds respectively.

In step S203, the first video and the second video are segmented according to the segmentation nodes to obtain the multiple first short videos and the multiple second short videos, where a duration of a first short video corresponding to a segmentation period is equal to a duration of a second short video corresponding to the same segmentation period.

In an embodiment, the computer device may clip the first video and the second video according to the acquired segmentation nodes to obtain the multiple first short videos and the multiple second short videos through the application program with the clipping function. The duration of the first short video corresponding to the segmentation period may be equal to the duration of the second short video corresponding to the same segmentation.

Exemplarily, if the video signal of the first video is not equal to the video signal of the second video, the audio signal of the first video is equal to the audio signal of the second video, and both the duration of the first video and the duration of the second video are 8 seconds, the first video is clipped into three short videos, which are the short video of 0 to 2 seconds, the short video of 2 to 6 seconds and the short video of 6 to 8 seconds respectively, while the second video is also clipped into a short video of 0 to 2 seconds, a short video of 2 to 6 seconds and a short video of 6 to 8 seconds, and a duration of a short video corresponding to each segmentation period is the same.

In the video editing method provided in the embodiment, the computer device may acquire the segmentation nodes on the timeline of the audio signal. The first video and the second video are segmented according to segmentation stages, and it is possible to obtain short videos, which have a same duration, of the first short video and the second short video corresponding to a same segmentation period, so that a video picture of subsequently obtained target synthesized video can be switched to the picture of the first short video or the picture of the second short video, and the playing effect of the target synthesized video is improved.

In an embodiment, in above step S1050, the first target short video and the second target short video are respectively selected from the multiple first short videos and the multiple second short videos according to the audio signal, and the first target short video and the second target short video are stitched to obtain the target synthesized video, which may be achieved by the following steps: according to each segmentation period on the timeline, a corresponding first target short video or a corresponding second target short video are selected to perform the stitching, until the total duration after the selected first target short video or the second target short video being stitched is equal to the duration of the audio signal, and the target synthesized video is obtained, where a duration of the selected first target short video or the selected second target short video is the same as a duration of a corresponding segmentation period, and an audio signal of the first short video corresponding to the segmentation period is the same as an audio signal of the second short video corresponding to the same segmentation period.

In an embodiment, the computer device may select, according to a first short video and a second short video corresponding to each segmentation period on the timeline of the audio signal, the corresponding first target short video or the corresponding second target short video from the multiple first short videos and the multiple second short videos to perform the stitching, until the total duration after the selected first target short video or the selected second target short video being stitched is equal to the duration of the audio signal of the first video or the duration of the audio signal of the second video, and the target synthesized video is obtained. The first target short video may be one or more first short videos of the multiple first short videos, the duration of the first target short video is the same as the duration of the corresponding segmentation period, and the second target short video may be one or more second short videos of the multiple second short videos, the duration of the second target short video is the same as the duration of the corresponding segmentation period, and audio signals of the first short video and the second short video corresponding to each segmentation period may be the same.

Exemplarily, if the video signal of the first video is different from the video signal of the second video, the audio signal of the first video is the same as the audio signal of the second video, and the duration of the video signal of the first video and the duration of the video signal of the second video are both 8 seconds, both the first video and the second video are clipped into three short videos, which are the short video of 0 to 2 seconds, the short video of 2 to 6 seconds and the short video of 6 to 8 seconds respectively, the segmentation periods of the first video and the second video are 0 to 2 seconds, 2 to 6 seconds and 6 to 8 seconds, the duration of the first short video or the second short video corresponding to each segmentation period is the same, and the audio signals of the first short video or the second short video corresponding to the each segmentation period is also the same. If a stitched first short video is the first target short video selected from the multiple first short videos, and a stitched second short video is the second target short video selected from the multiple second short videos, the duration of the first target short video is a duration of a first segmentation period as 2 seconds, and the duration of the second target short video is a duration of a second segmentation period as 4 seconds.

In the video editing method provided in the embodiment, the computer device may select and stitch, according to each segmentation period on the timeline, the corresponding first target short video or the corresponding second target short video to obtain the target synthesized video which has the total duration equal to the duration of the audio signal, so that the video picture of the target synthesized video can be switched to a picture of the first short video or a picture of the second short video, and the playing effect of the target synthesized video is improved.

Figure 3:
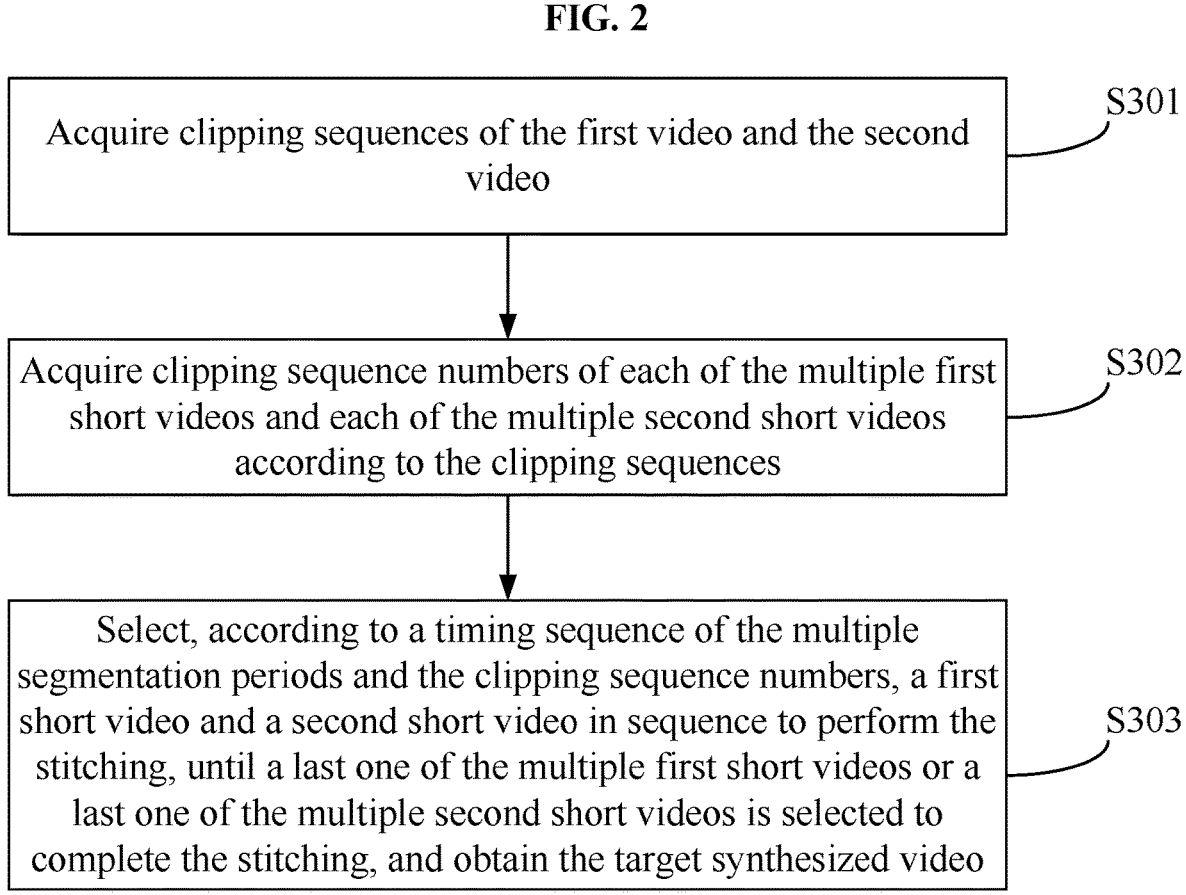
FIG. 3 is a flowchart of a method for obtaining a target synthesized video according to an embodiment of the present disclosure.

In an embodiment, as shown in FIG. 3, the step in which according to the each segmentation period on the timeline, the corresponding first target short video or the corresponding second target short video are selected to perform the stitching, until the total duration after the selected first target short video or the selected second target short video being stitched is equal to the duration of the audio signal, and the target synthesized video is obtained may be achieve through following manners and includes steps described below.

In step S301, clipping sequences of the first video and the second video are acquired.

In an embodiment, the computer device may acquire the clipping sequences of the first video and the second video according to the timeline of the audio signal and the segmentation periods.

In an embodiment, the above clipping sequences correspond to the segmentation periods, and each segmentation period corresponds to a clipping sequence. Exemplarily, if the video signal of the first video is not the same as the video signal of the second video, the audio signal of the first video is the same as the audio signal of the second video, and the duration of the first video and the duration of the second video are both 8 seconds, both the first video and the second video are clipped into three short videos, the segmentation periods of the first video and the second video are 0 to 2 seconds, 2 to 6 seconds and 6 to 8 seconds. The clipping sequences of the three short videos corresponding to the first video successively correspond to a1, b1 and c1, and the clipping sequences of the three short videos corresponding to the second video successively correspond to a2, b2 and c2, all of which are sorted in a timeline order.

In step S302, clipping sequence numbers of each of the multiple first short videos and each of the multiple second short videos are acquired according to the clipping sequences.

In an embodiment, the clipping sequence and clipping sequence number of each first short video correspond to the clipping sequence and clipping sequence number of each second short video.

Exemplarily, if the clipping sequences of the three short videos corresponding to the first video successively correspond to a1, b1, and c1, the clipping sequence numbers corresponding to the three first short videos may be marked as 11, 12, and 13 according to the clipping sequences. If the clipping sequences of the three short videos corresponding to the second video successively correspond to a2, b2, and c2, the clipping sequence numbers corresponding to the three second short videos may be marked as 21, 22, and 23 according to the clipping sequences.

In step S303, according to a timing sequence of the multiple segmentation periods and the clipping sequence numbers, the first short video and the second short video are selected in sequence to perform the stitching until a last one of the multiple first short videos or a last one of the multiple second short videos is selected to complete the stitching, and the target synthesized video is obtained.

In an embodiment, according to the time sequences of the segmentation periods and the clipping sequences of the first video and the second video, the user may start with a first one of the first short videos in the first video or a first one of the second short videos in the second video, and select a first short video or a second short video in sequence to perform the stitching, until the last one of the first short videos or the last one of the second short videos is selected to complete the stitching, and the target synthesized video is obtained.

The first one of the multiple second short videos is selected from the multiple second short videos to serve as a first target short video to be stitched in the target synthesized video according to the timing sequence of the each segmentation period and the clipping sequence numbers.

In an embodiment, the computer device may write each selected first short video or each selected second short video into a target video file to obtain the target synthesized video. A first segment short video in the stitched target synthesized video is the first one of the multiple second short videos in the second video. In addition, stitched short videos selected in the other segmentation periods other than a first segmentation period may be any one segment of short videos in the multiple first short videos and the multiple second short videos corresponding to the segmentation periods.

In the video editing method provided in the embodiment, the computer device may select the first short video or the second short video to perform the stitching according to the timing sequence of the segmentation periods and the clipping sequence numbers, and the target synthesized video having the audio signal equal to the audio signals of the first video and the second video is obtained, and the video picture of the target synthesized video can be switched to the picture of the first short video or the picture of the second short video, so that the playing effect of the target synthesized video is improved.

It is to be noted that although multiple steps in flowcharts of FIGS. 1 to 3 are shown sequentially and indicated by arrows, the steps are not necessarily performed sequentially in the sequences indicated by the arrows. Unless expressly stated herein, an execution of the steps is not strictly sequential, and the steps may be executed in other sequences. At least a portion of the steps in FIGS. 1 to 3 may include multiple sub-steps or multiple stages. The sub-steps or the stages are not necessarily performed at the same time, but may be performed in different times, and an execution sequence of the sub-steps or the stages is not necessarily performed sequentially, but may be performed alternately or alternately with other steps or at least a portion of the sub-steps or stages of other steps.

Figure 4:
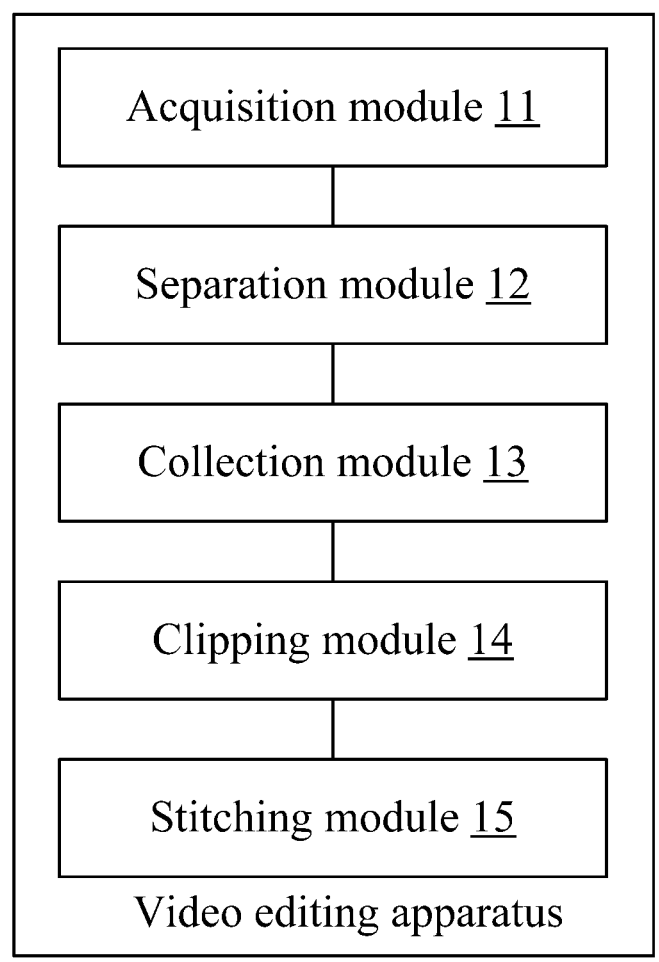
FIG. 4 is a structural diagram of a video editing apparatus according to an embodiment of the present disclosure.

FIG. 4 is a structural diagram of a video editing apparatus according to an embodiment of the present disclosure. As shown in FIG. 4, the apparatus may include an acquisition module 11, a separation module 12, a collection module 13, a clipping module 14 and a stitching module 15.

The acquisition module 11 is configured to acquire a first video.

The separation module 12 is configured to separate a first video signal of the first video and an audio signal of the first video.

The collection module 13 is configured to collect a second video signal, and synthesize the collected second video signal with the audio signal to obtain a second video.

The clipping module 14 is configured to clip the first video and the second video to obtain multiple first short videos and multiple second short videos respectively.

The stitching module 15 is configured to select, according to the audio signal, a first target short video and a second target short video from the multiple first short videos and the multiple second short videos, and stitch the first target short video and the second target short video to obtain a target synthesized video.

A number of the second short videos is equal to a number of the first short videos.

The video editing apparatus provided in the embodiment may be used for executing the above-mentioned embodiments. The implementation principle and technical effects are similar and thus will not be repeated here again.

In an embodiment, a duration of the second video signal is equal to a duration of the first video signal.

The video editing apparatus provided in the embodiment may be used for executing the above-mentioned embodiments. The implementation principle and technical effects are similar and thus will not be repeated here again.

Figure 5:
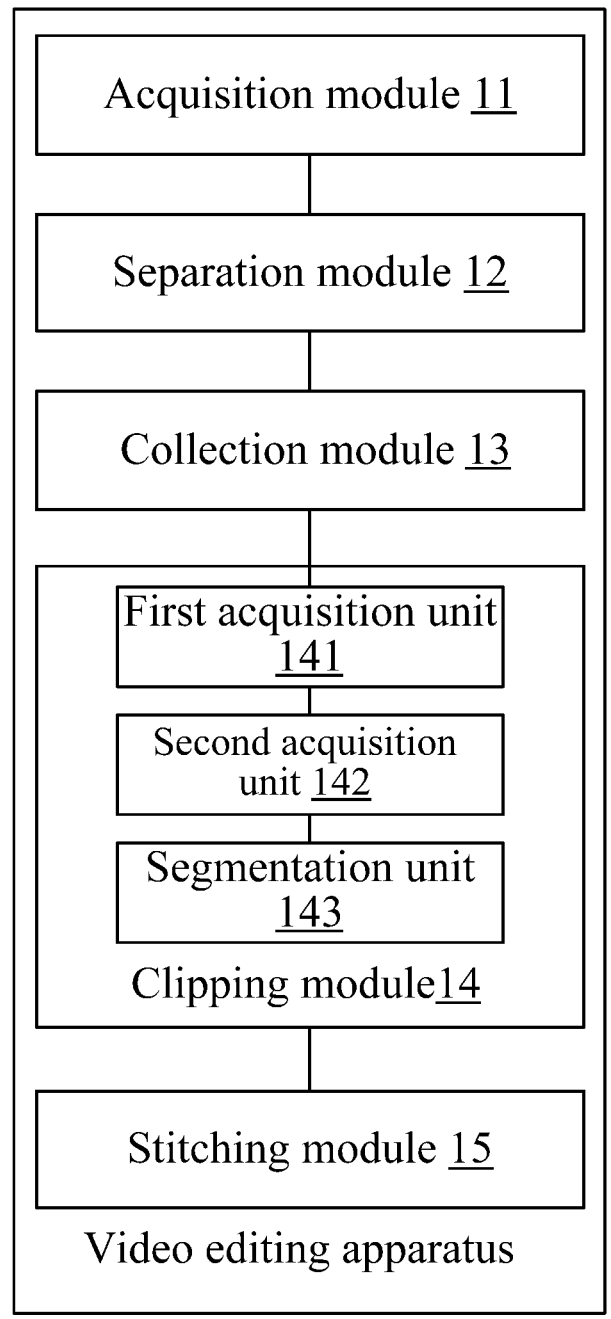
FIG. 5 is a structural diagram of a clipping module according to an embodiment of the present disclosure.

FIG. 5 is a structural diagram of a clipping module according to an embodiment of the present disclosure. As shown in FIG. 5, the clipping module 14 includes a first acquisition unit 141, a second acquisition unit 142 and a segmentation unit 143.

The first acquisition unit 141 is configured to acquire a timeline of the audio signal.

The second acquisition unit 142 is configured to acquire segmentation nodes of the timeline, where the segmentation nodes divide the timeline into multiple segmentation periods.

The segmentation unit 143 is configured to segment, according to the segmentation nodes, the first video and the second video respectively to obtain the multiple first short videos and the multiple second short videos, where a duration of a first short video corresponding to a segmentation period is equal to a duration of a second short video corresponding to the same segmentation period.

The video editing apparatus provided in the embodiment may be used for executing the above-mentioned embodiments. The implementation principle and technical effects are similar and thus will not be repeated here again.

In an embodiment, the stitching module 15 is configured to select, according to each segmentation period on the timeline, a corresponding first target short video or a corresponding second target short video to perform the stitching, until the total duration after the first target short video or the second target short video being stitched is equal to the duration of the audio signal, and the target synthesized video is obtained, where a duration of the selected first target short video or the selected second target short video is the same as a duration of a segmentation period corresponding to the selected first target short video or the selected second target short video, and an audio signal of the first short video corresponding to the segmentation period is same as an audio signal of the second short video corresponding to the same segmentation period.

The video editing apparatus provided in the embodiment may be used for executing the above-mentioned embodiments. The implementation principle and technical effects are similar and thus will not be repeated here again.

Figure 6:
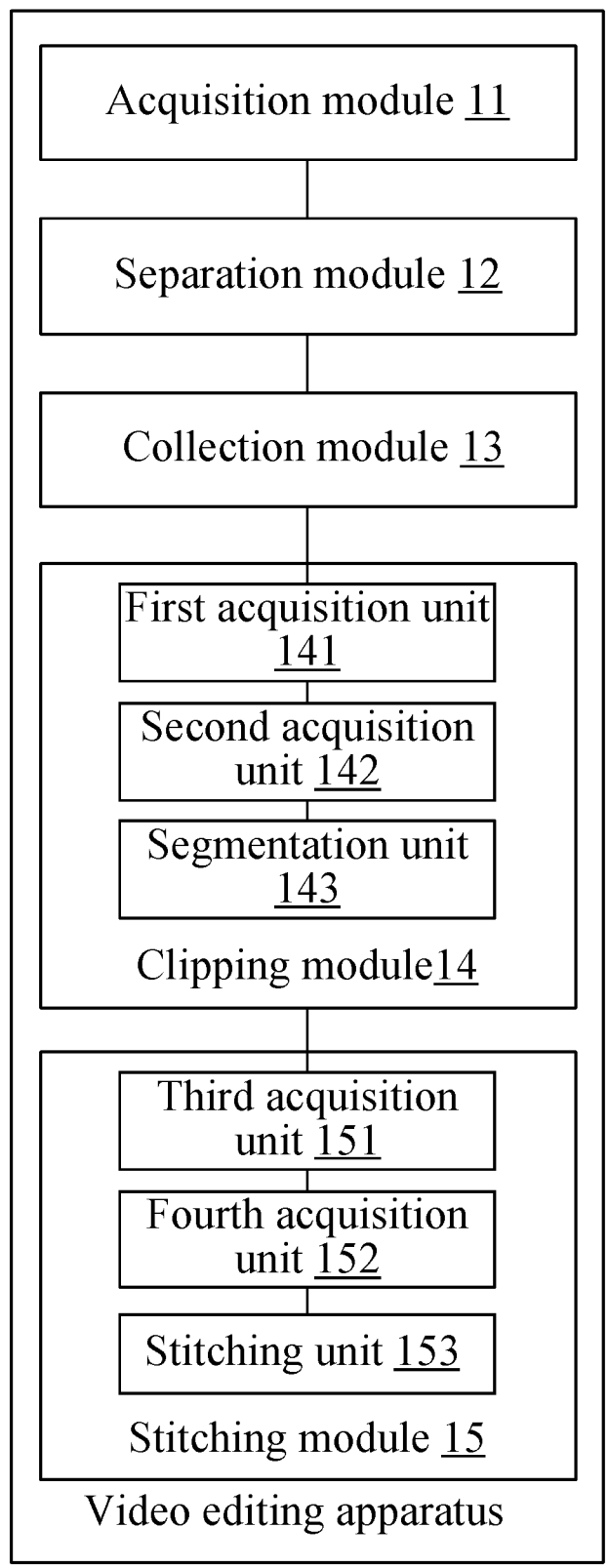
FIG. 6 is a structural diagram of a stitching module according to an embodiment of the present disclosure.

In an embodiment, as shown in FIG. 6, the stitching module 15 includes a third acquisition unit 151, a fourth acquisition unit 152 and a stitching unit 153.

The third acquisition unit 151 is configured to acquire clipping sequences of the first video and the second video.

The fourth acquisition unit 152 is configured to acquire clipping sequence numbers of each of the multiple first short videos and each of the multiple second short videos according to the clipping sequences.

The stitching unit 153 is configured to select, according to a timing sequence of the multiple segmentation periods and the clipping sequence numbers, the multiple first short videos and the multiple second short videos in sequence to perform the stitching, until a last one of the multiple first short videos or a last one of the multiple second short videos is selected to complete the stitching, and obtain the target synthesized video.

According to the timing sequence of the multiple segmentation periods and the clipping sequence numbers, a first one of the multiple second short videos is selected from the multiple second short videos to serve as a first target short video to be stitched.

The video editing apparatus provided in the embodiment may be used for executing the above-mentioned embodiments. The implementation principle and technical effects are similar and thus will not be repeated here again.

Moreover, the definition of the video synthesizing apparatus may be referred to the above definition of the video synthesizing method, and thus will not be repeated herein. Multiple modules in the video synthesizing apparatus of the computer device described above may be implemented in whole or in part by software, hardware, and combination thereof. Each module described above may be embedded in or independent of a processor in the computer device in a hardware form, or stored in a memory in the computer device in a software form, so that the processor can invoke and execute an operation corresponding to the each module described above.

Figure 7:
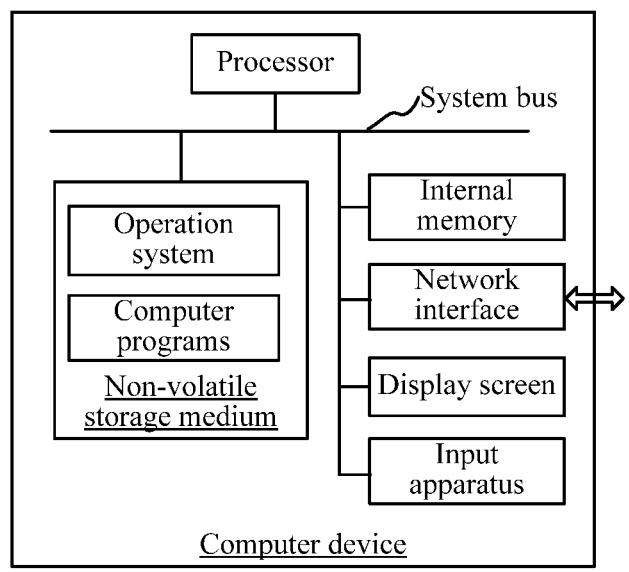
FIG. 7 is a schematic diagram of an internal structure of a computer device according to an embodiment of the present disclosure.

An internal structure of a computer device provided in an embodiment may be shown in FIG. 7. The computer device includes a processor, a memory, a network interface, a display screen and an input apparatus connected via a system bus. The processor of the computer device is configured to provide calculation capability and control capability. The memory of the computer device includes a non-volatile storage medium and an internal memory. The non-volatile storage medium stores an operation system and computer programs. The internal memory provides an environment for running the operation system stored and the computer programs in the non-volatile storage medium. The network interface of the computer device is configured to communicate with an external terminal through a network connection. The computer programs, when executed by the processor, implement a video synthesizing method. The display screen of the computer device may be a liquid crystal display screen or an electronic ink display screen, and the input apparatus of the computer device may be a touch layer covered on the display screen, or may be a key, a trackball or a touch pad disposed on a shell of the computer device, or may be an externally connected keyboard, touch pad or mouse, etc.

It should be understood by those skilled in the art that the structure illustrated in FIG. 7 is only a block diagram of a portion of the structure related to the present application solution and does not limit the computer device to which the present application solution is applied, and an actual computer device may include more or fewer components than those illustrated, or assembly of some components or the layout of different components.

A computer device is provided in an embodiment and includes a memory and a processor, where the memory stores computer programs, and when the processor executes the computer programs, the processor implements the method of any embodiment of the present disclosure. For example, the method includes the steps described below.

A first video is acquired.

A first video signal of the first video and an audio signal of the first video are separated.

A second video signal is collected, and the collected second video signal is synthesized with the audio signal to obtain a second video.

The first video and the second video are clipped to obtain multiple first short video and multiple second short videos respectively.

A first target short video and a second target short video are selected according to the audio signal from the multiple first short videos and the multiple second short videos, and the first target short video and the second target short video are stitched to obtain a target synthesized video.

A storage medium is provided in an embodiment and is configured to store computer programs for executing the method of any embodiment described above when executed by a processor.

A first video is acquired.

A first video signal of the first video and an audio signal of the first video are separated.

A second video signal is collected, and the collected second video signal is synthesized with the audio signal to obtain a second video.

The first video and the second video are clipped to obtain multiple first short videos and multiple second short videos, respectively.

A first target short video and a second target short video are selected according to the audio signal from the multiple first short videos and the multiple second short videos, and the first target short video and the second target short video are stitched to obtain a target synthesized video.

It will be understood by those of ordinary skill in the art that all or part of the procedure steps in the methods of the above embodiments may be implemented by related hardware instructed by computer programs, the computer programs may be stored in a non-volatile computer-readable storage medium, and during the execution of the computer programs, the procedure steps in the above method embodiments may be implemented. All references to the memory, storage, database, or other media used in multiple embodiments provided in the present application may include a non-volatile and/or volatile memory. The non-volatile memory may be a read-only memory (ROM), a programmable read-only memory (PROM), an electrical programmable read-only memory (EPROM), an electrically erasable programmable read-only memory (EEPROM) or a flash memory. The volatile memory may be a random access memory (RAM) or an external cache memory. By way of illustration but not limitation, many forms of RAMs may be used, such as a static random access memory (SRAM), a dynamic random access memory (DRAM), a synchronous dynamical random access memory (SDRAM), a double data rate synchronous dynamic random access memory (DDRSDRAM), an enhanced synchronous dynamic random access memory (ESDRAM), a synchlink dynamic random access memory (SLDRAM), a direct rambus random access memory (DRRAM), a direct rambus dynamic random access memory (DRDRAM) and a rambus dynamic random access memory (RDRAM), etc.

What is claimed is:

1. A video editing method, comprising:
   acquiring a first video;
   separating a first video signal of the first video and an audio signal of the first video;
   collecting a second video signal, and synthesizing the collected second video signal with the audio signal to obtain a second video;
   clipping, according to semantics of the audio signal, the first video and the second video to obtain a plurality of first short videos and a plurality of second short videos, respectively, and clipping a timeline of the audio signal into a plurality of segmentation periods according to the semantics of the audio signal; and
   selecting, for each segmentation period on the timeline of the audio signal, one of a first target short video from the plurality of first short videos or a second target short video from the plurality of the second short videos sequentially, and stitching all of the selected target short videos corresponding to the plurality of segmentation periods to obtain a target synthesized video; wherein a total duration of the target synthesized video is equal to a duration of the audio signal, a duration of a selected target short video being equal to a duration of a segmentation period corresponding to the selected target short video.

2. The method of claim 1, wherein a number of the plurality of first short videos is equal to a number of the plurality of second short videos.

3. The method of claim 1, wherein clipping, according to the semantics of the audio signal, the first video and the second video to obtain the plurality of first short videos and the plurality of second short videos respectively comprises:
acquiring the timeline of the audio signal;
acquiring segmentation nodes of the timeline according to the semantics of the audio signal, wherein the segmentation nodes divide the timeline into the plurality of segmentation periods; and
segmenting, according to the segmentation nodes, the first video and the second video respectively to obtain the plurality of first short videos and the plurality of second short videos;
wherein a duration of a first short video corresponding to a segmentation period is equal to a duration of a second short video corresponding to the same segmentation period.

4. The method of claim 3, wherein selecting, for each segmentation period on the timeline of the audio signal, one of the first target short video from the plurality of first short videos or the second target short video from the plurality of the second short videos sequentially, and stitching all of the selected target short videos corresponding to the plurality of segmentation periods to obtain the target synthesized video comprises:
selecting, according to each segmentation period on the timeline, a corresponding first target short video or a corresponding second target short video, performing the stitching on all of the selected target short videos to obtain the target synthesized video;
wherein a duration of the selected corresponding first target short video or the selected corresponding second target short video is equal to a duration of a segmentation period corresponding to the selected first target short video or the selected second target short video, and an audio signal of the first short video corresponding to the segmentation period is the same as an audio signal of the second short video corresponding to the same segmentation period.

5. The method of claim 4, wherein selecting, according to the each segmentation period on the timeline, the corresponding first target short video or the corresponding second target short video, performing the stitching on all of the selected target short videos to obtain the target synthesized video comprises:
acquiring clipping sequences of the first video and the second video;
acquiring clipping sequence numbers of each of the plurality of first short videos and each of the plurality of second short videos according to the clipping sequences; and
selecting, according to a timing sequence of the plurality of segmentation periods and the clipping sequence numbers, the first short video or the second short video in sequence to perform the stitching until a last one of the plurality of first short videos in the first video or a last one of the plurality of second short videos in the second video is selected to complete the stitching, and obtaining the target synthesized video.

6. The method of claim 5, wherein selecting, according to the timing sequence of the plurality of segmentation periods and the clipping sequence numbers, the first short video or the second short video in sequence to perform the stitching until the last one of the plurality of first short videos in the first video or the last one of the plurality of second short videos in the second video is selected to complete the stitching, and obtaining the target synthesized video comprises:
selecting a first one of the plurality of second short videos from the plurality of second short videos to serve as a first target short video to be stitched according to the timing sequence of the plurality of segmentation periods and the clipping sequence numbers.

7. The method of claim 1, wherein a duration of the second video signal is equal to a duration of the first video signal.

8. A computer device, comprising a memory and a processor, wherein the memory is configured to store a computer program executable on the processor, and when executing the computer program, the processor is configured to implement:
acquiring a first video;
separating a first video signal of the first video and an audio signal of the first video;
collecting a second video signal, and synthesizing the collected second video signal with the audio signal to obtain a second video;
clipping, according to semantics of the audio signal, the first video and the second video to obtain a plurality of first short videos and a plurality of second short videos respectively; and clipping a timeline of the audio signal into a plurality of segmentation periods according to the semantics of the audio signal; and
selecting, for each segmentation period on the timeline of the audio signal, one of a first target short video from the plurality of first short videos or a second target short video from the plurality of the second short videos sequentially, and stitching all of the selected target short videos corresponding to the plurality of segmentation periods to obtain a target synthesized video, wherein a total duration of the target synthesized video is equal to a duration of the audio signal, and a duration of a selected target short video being equal to a duration of a segmentation period corresponding to the selected target short video.

9. The computer device of claim 8, wherein a number of the plurality of first short videos is equal to a number of the plurality of second short videos.

10. The computer device of claim 8, wherein when executing the computer program, the processor implements clipping, according to the semantics of the audio signal, the first video and the second video to obtain the plurality of first short videos and the plurality of second short videos respectively by:
acquiring the timeline of the audio signal;
acquiring segmentation nodes of the timeline according to the semantics of the audio signal, wherein the segmentation nodes divide the timeline into the plurality of segmentation periods; and
segmenting, according to the segmentation nodes, the first video and the second video respectively to obtain the plurality of first short videos and the plurality of second short videos;
wherein a duration of a first short video corresponding to a segmentation period is equal to a duration of a second short video corresponding to the same segmentation period.

11. The computer device of claim 10, wherein when executing the computer program, the processor implements selecting, for each segmentation period on the timeline of the audio signal, one of the first target short video from the plurality of first short videos or the second target short video from the plurality of the second short videos sequentially, and stitching all of the selected target short videos corresponding to the plurality of segmentation periods to obtain the target synthesized video by:
- selecting, according to each segmentation period on the timeline, a corresponding first target short video or a corresponding second target short video, performing the stitching on all of the selected target short videos, to obtain the target synthesized video;
- wherein a duration of the selected corresponding first target short video or the selected corresponding second target short video is equal to a duration of a segmentation period corresponding to the selected first target short video or the selected second target short video, and an audio signal of the first short video corresponding to the segmentation period is the same as an audio signal of the second short video corresponding to the same segmentation period.

12. The computer device of claim 11, wherein when executing the computer program, the processor implements selecting, according to the each segmentation period on the timeline, the corresponding first target short video or the corresponding second target short video, performing the stitching on all of the selected target short videos to obtain the target synthesized video by:
- acquiring clipping sequences of the first video and the second video;
- acquiring clipping sequence numbers of each of the plurality of first short videos and each of the plurality of second short videos according to the clipping sequences; and
- selecting, according to a timing sequence of the plurality of segmentation periods and the clipping sequence numbers, the first short video or the second short video in sequence to perform the stitching until a last one of the plurality of first short videos in the first video or a last one of the plurality of second short videos in the second video is selected to complete the stitching, and obtaining the target synthesized video.

13. The computer device of claim 12, wherein when executing the computer program, the processor implements selecting, according to the timing sequence of the plurality of segmentation periods and the clipping sequence numbers, the first short video or the second short video in sequence to perform the stitching until the last one of the plurality of first short videos in the first video or the last one of the plurality of second short videos in the second video is selected to complete the stitching, and obtaining the target synthesized video by:
- selecting a first one of the plurality of second short videos from the plurality of second short videos to serve as a first target short video to be stitched according to the timing sequence of the plurality of segmentation periods and the clipping sequence numbers.

14. The computer device of claim 8, wherein a duration of the second video signal is equal to a duration of the first video signal.

15. A non-transitory readable storage medium, storing a computer program, wherein when executed by a processor, the computer program implements:
- acquiring a first video;
- separating a first video signal of the first video and an audio signal of the first video;
- collecting a second video signal, and synthesizing the collected second video signal with the audio signal to obtain a second video;
- clipping, according to semantics of the audio signal, the first video and the second video to obtain a plurality of first short videos and a plurality of second short videos respectively; and clipping a timeline of the audio signal into a plurality of segmentation periods according to the semantics of the audio signal; and
- selecting, for each segmentation period on the timeline of the audio signal, one of a first target short video from the plurality of first short videos or a second target short video from the plurality of the second short videos sequentially, and stitching all selected target short videos corresponding to the plurality of segmentation periods to obtain a target synthesized video; wherein a total duration of the target synthesized video is equal to a duration of the audio signal, and a duration of the selected target short video is equal to a duration of a segmentation period corresponding to the selected target short video.

16. The non-transitory readable storage medium of claim 15, wherein a number of the plurality of first short videos is equal to a number of the plurality of second short videos.

17. The non-transitory readable storage medium of claim 15, wherein the computer program, when executed by the processor, implements clipping, according to the semantics of the audio signal, the first video and the second video to obtain the plurality of first short videos and the plurality of second short videos respectively by:
- acquiring the timeline of the audio signal;
- acquiring segmentation nodes of the timeline according to the semantics of the audio signal, wherein the segmentation nodes divide the timeline into the plurality of segmentation periods; and
- segmenting, according to the segmentation nodes, the first video and the second video respectively to obtain the plurality of first short videos and the plurality of second short videos;
- wherein a duration of a first short video corresponding to a segmentation period is equal to a duration of a second short video corresponding to the same segmentation period.

18. The non-transitory readable storage medium of claim 17, wherein when executed by the processor, the computer program implements selecting, for each segmentation period on the timeline of the audio signal, one of the first target short video from the plurality of first short videos or the second target short video from the plurality of the second short videos sequentially, and stitching all of the selected target short videos corresponding to the plurality of segmentation periods to obtain the target synthesized video by:
- selecting, according to each segmentation period on the timeline, a corresponding first target short video or a corresponding second target short video, performing the stitching on all of the selected target short videos to obtain the target synthesized video;
- wherein a duration of the selected corresponding first target short video or the selected corresponding second target short video is equal to a duration of a segmentation period corresponding to the selected first target short video or the selected second target short video, and an audio signal of the first short video corresponding to the segmentation period is the same as an audio signal of the second short video corresponding to the same segmentation period.

19. The non-transitory readable storage medium of claim 18, wherein when executed by the processor, the computer program implements selecting, according to the each segmentation period on the timeline, the corresponding first target short video or the corresponding second target short video, performing the stitching on all of the selected target short videos to obtain the target synthesized video by:
- acquiring clipping sequences of the first video and the second video;
- acquiring clipping sequence numbers of each of the plurality of first short videos and each of the plurality of second short videos according to the clipping sequences; and
- selecting, according to a timing sequence of the plurality of segmentation periods and the clipping sequence numbers, the first short video or the second short video in sequence to perform the stitching until a last one of the plurality of first short videos in the first video or a last one of the plurality of second short videos in the second video is selected to complete the stitching, and obtaining the target synthesized video.

20. The non-transitory readable storage medium of claim 19, wherein when executed by the processor, the computer program implements selecting, according to the timing sequence of the plurality of segmentation periods and the clipping sequence numbers, the first short video or the second short video in sequence to perform the stitching until the last one of the plurality of first short videos in the first video or the last one of the plurality of second short videos in the second video is selected to complete the stitching, and obtaining the target synthesized video by:
- selecting a first one of the plurality of second short videos from the plurality of second short videos to serve as a first target short video to be stitched according to the timing sequence of the plurality of segmentation periods and the clipping sequence numbers.

* * * * *